(12) United States Patent
Waitkus et al.

(10) Patent No.: US 12,458,524 B2
(45) Date of Patent: Nov. 4, 2025

(54) SYSTEMS FOR ASEPTIC URINE SAMPLING AND METHODS THEREOF

(71) Applicant: C. R. Bard, Inc., Franklin Lakes, NJ (US)

(72) Inventors: Tim Waitkus, Sparta, NJ (US); Chris Fodouop, Atlanta, GA (US); Kelsey Leeke, Atlanta, GA (US); John Gohde, Decatur, GA (US)

(73) Assignee: C. R. Bard, Inc., Franklin Lakes, NJ (US)

( * ) Notice: Subject to any disclaimer, the term of this patent is extended or adjusted under 35 U.S.C. 154(b) by 1167 days.

(21) Appl. No.: 17/053,326

(22) PCT Filed: May 13, 2019

(86) PCT No.: PCT/US2019/032055
§ 371 (c)(1),
(2) Date: Nov. 5, 2020

(87) PCT Pub. No.: WO2019/226396
PCT Pub. Date: Nov. 28, 2019

(65) Prior Publication Data
US 2021/0069006 A1    Mar. 11, 2021

Related U.S. Application Data

(60) Provisional application No. 62/674,956, filed on May 22, 2018.

(51) Int. Cl.
*A61F 5/44* (2006.01)
*A61M 25/00* (2006.01)

(52) U.S. Cl.
CPC ....... *A61F 5/4405* (2013.01); *A61M 25/0014* (2013.01); *A61M 25/0017* (2013.01);
(Continued)

(58) Field of Classification Search
CPC ............. A61F 5/4405; A61M 25/0017; A61M 25/0014; A61M 25/0097; A61M 2202/0496; A61M 2210/1089
(Continued)

(56) References Cited

U.S. PATENT DOCUMENTS 4,080,175 A * 3/1978 Chulay ................. B04B 5/0414
422/918
4,963,132 A * 10/1990 Gibson ................. A61M 39/20
604/905
(Continued)

FOREIGN PATENT DOCUMENTS

CN    104162224 A  * 11/2014  ........ A61M 25/1018
EP     0733380 B1    6/1999
(Continued)

OTHER PUBLICATIONS

PCT/ US19/32055 filed May 13, 2019 International Search Report and Written Opinion dated Aug. 7, 2019.

*Primary Examiner* — Andrew J Mensh
(74) *Attorney, Agent, or Firm* — Rutan & Tucker LLP

(57) ABSTRACT

A urine-sampling system for aseptic urine sampling includes a catheter assembly and a sampling-port access device. The catheter assembly includes a urinary catheter, drainage tubing, and a connector fluidly connecting the urinary catheter to the drainage tubing. The connector includes a urine-sampling port. The sampling-port access device includes a tip at an end of a barrel configured to fluidly connect the sampling-port access device to the urine-sampling port of the catheter assembly. Each of the tip of the sampling-port access device and the urine-sampling port has a complementary fastening means for—fastening to the other of the tip of the sampling-port access device and the urine-sampling port. Each of the complementary fastening means ensures proper mating of the tip of the sampling-port access (Continued)

Figure 1:
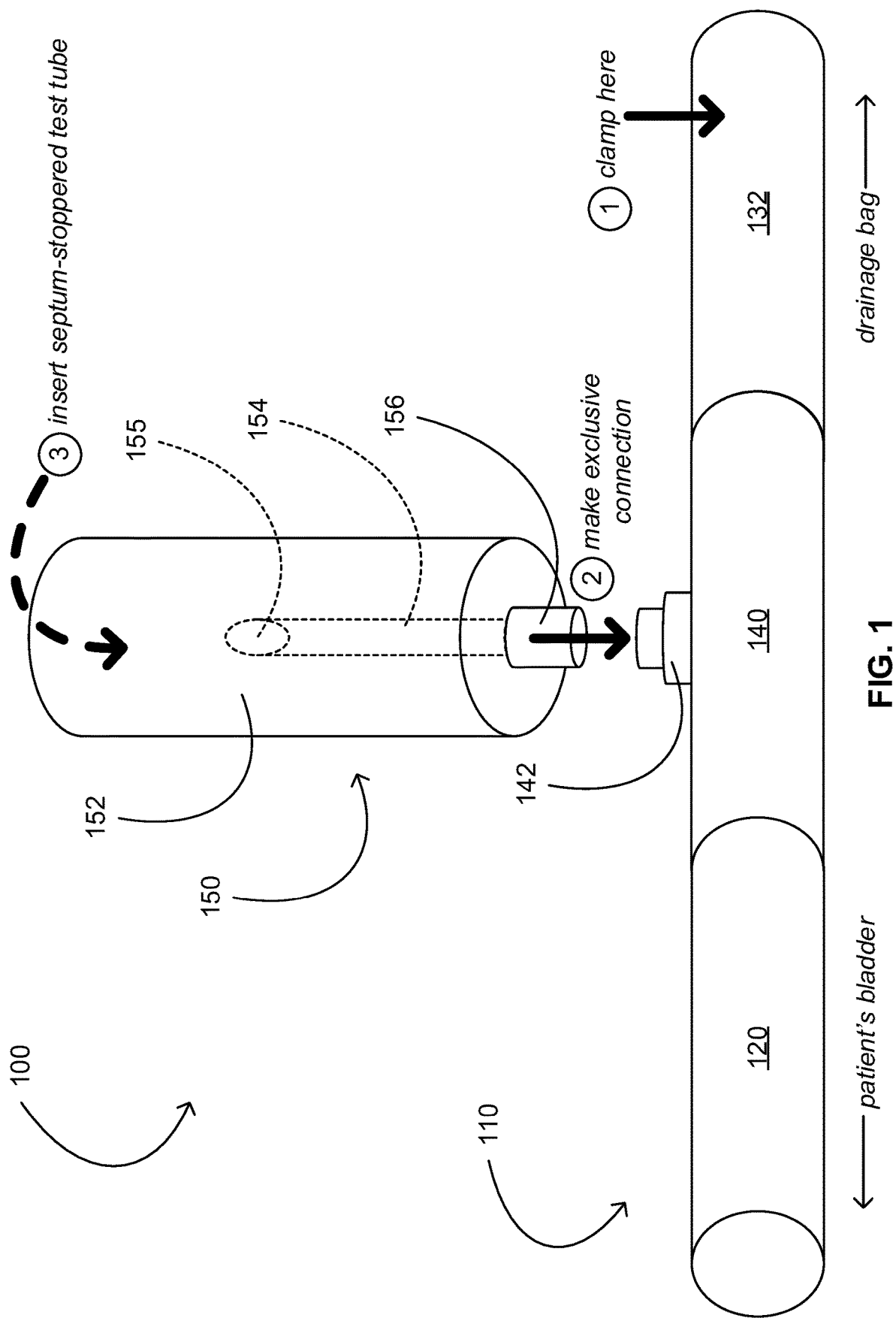

device and the urine-sampling port for aseptic urine sampling. In addition to various urine-sampling systems such as the foregoing, methods of use are also disclosed.

23 Claims, 13 Drawing Sheets

(52) U.S. Cl.
CPC . *A61M 25/0097* (2013.01); *A61M 2202/0496* (2013.01); *A61M 2210/1089* (2013.01)

(58) Field of Classification Search
USPC .......................................................... 604/544
See application file for complete search history.

(56) References Cited

U.S. PATENT DOCUMENTS

| | | | | |
|---|---|---|---|---|
| 5,281,206 | A * | 1/1994 | Lopez | A61M 39/1011 |
| | | | | 604/905 |
| 9,827,410 | B2 * | 11/2017 | Cowan | A61M 39/10 |
| 2004/0238776 | A1 | 12/2004 | Peters et al. | |
| 2005/0107765 | A1 * | 5/2005 | Kashmiran | A61M 39/146 |
| | | | | 604/403 |
| 2007/0203463 | A1 * | 8/2007 | Salvadori | A61G 7/0503 |
| | | | | 604/350 |
| 2010/0183399 | A1 * | 7/2010 | Suga | F16B 39/12 |
| | | | | 411/259 |
| 2013/0274715 | A1 * | 10/2013 | Chan | A61B 17/22 |
| | | | | 604/514 |
| 2014/0309551 | A1 * | 10/2014 | Burkholz | A61B 5/150213 |
| | | | | 600/573 |

FOREIGN PATENT DOCUMENTS

| | | |
|---|---|---|
| EP | 2706921 B1 | 2/2018 |
| WO | 2019/226396 A1 | 11/2019 |

* cited by examiner

SECTION G

SYSTEMS FOR ASEPTIC URINE SAMPLING AND METHODS THEREOF

PRIORITY

This application is a U.S. national stage application of International Application No. PCT/US2019/032055, which claims the benefit of priority to U.S. Provisional Application No. 62/674,956, filed May 22, 2018, each of which is incorporated by reference in its entirety into this application.

BACKGROUND

Hospitals around the country are understandably focusing their efforts on catheter-associated urinary tract infection ("CAUTI") prevention bundles to achieve better outcomes, limit the risk of Centers for Medicare & Medicaid Services ("CMS") reimbursement penalties, and reduce the occurrence of antimicrobial resistance. Historical prevention efforts have focused on closed systems, aseptic insertion technique, and maintenance of Foley-catheterized patients. However, despite 96% of nursing decision makers believing there is variation in how nurses within their facilities take urine samples from Foley catheters, there has been little to no broad-based focus to date on the significant variation associated with urine-sampling practice.

Research suggests there is variation in all aspects of urine sampling including where the urine sample is taken from the collection system, how the urine-sampling area is cleaned, what device is used to take the urine sample, and how the urine sample is transferred to the lab. This variation is a fundamental issue affecting documentation of CAUTI outcomes. In fact, 100% of nursing decision makers believe variation and improper urine-sampling technique can lead to an increased risk of contamination and therefore false-positive CAUTIs. Moreover, up to 70% of urine cultures reflect false-positive results leading to inaccurate CAUTI diagnoses and inappropriate antibiotic treatments, as well as artificially undermining the time and resources hospitals have dedicated toward reducing the risk of CAUTI by other means. This problem presents an ongoing challenge to those seeking to reduce CAUTI rates to avoid CMS reimbursement penalties.

Disclosed are urine-sampling systems and methods thereof that address at least the foregoing.

SUMMARY

Disclosed is a urine-sampling system for aseptic urine sampling including, in some embodiments, a catheter assembly and a sampling-port access device. The catheter assembly includes a urinary catheter, drainage tubing, and a connector fluidly connecting the urinary catheter to the drainage tubing. The connector includes a urine-sampling port. The sampling-port access device includes a tip at an end of a barrel configured to fluidly connect the sampling-port access device to the urine-sampling port of the catheter assembly. Each of the tip of the sampling-port access device and the urine-sampling port has a complementary fastening means for fastening to the other of the tip of the sampling-port access device and the urine-sampling port. Each of the complementary fastening means ensures proper mating of the tip of the sampling-port access device and the urine-sampling port for aseptic urine sampling.

In some embodiments, the complementary fastening means of the tip of the sampling-port access device includes a complementary thread in which an internal thread of a lock ring or a rotatable lock collar around a male connector of the tip of the sampling-port access device is configured to mate with an external thread about a female connector of the urine-sampling port.

In some embodiments, the complementary fastening means of the tip of the sampling-port access device includes a complementary thread in which an external thread about a male connector of the tip of the sampling-port access device is configured to mate with an internal thread of a female connector of the urine-sampling port.

In some embodiments, the thread includes a thread pattern having two or more leads. At least a first lead of the two or more leads has a lead diameter greater than a second lead of the two or more leads.

In some embodiments, the thread includes a thread pattern having three leads.

In some embodiments, the thread includes a left-handed thread pattern.

In some embodiments, each of the tip of the sampling-port access device and the urine-sampling port matches a color of the other of the tip of the sampling-port access device and the urine-sampling port. The color of the tip of the sampling-port access device and the urine-sampling port being matched reduces a risk of urine-sample contamination by any attempted misconnection of the tip of the sampling-port access device or the urine-sampling port.

In some embodiments, the urine-sampling system further includes one or more septum-stoppered test tubes. Each test tube of the one or more test tubes has an internal pressure less than atmospheric pressure. Each test tube of the one or more test tubes is also independently configured to include therein a formulation for urinalysis, a formulation for microbiological analysis, or no additives or preservatives.

In some embodiments, each test tube of the one or more test tubes has an outer diameter commensurate with or smaller than an inner diameter of the barrel of the sampling-port access device. Due to having such dimensions, each test of the one or more test tubes is allowed to slide into the barrel to pierce the septum stopper of the test tube with the needle of the sampling-port access device for urine sampling.

Also disclosed is a catheter assembly including, in some embodiments, a urinary catheter, drainage tubing, and a connector fluidly connecting the urinary catheter to the drainage tubing. The connector includes a urine-sampling port having a thread with a left-handed thread pattern, a thread pattern in which a first lead has a lead diameter greater than a second lead, a thread pattern having more than two leads, or a left-handed thread pattern having more than two leads. The urine-sampling port is configured to mate with a complementary thread of a tip of a sampling-port access device. The complementary thread ensures proper mating of the urine-sampling port and the sampling-port access device for aseptic urine sampling.

In some embodiments, the thread includes an external thread about a female connector of the urine-sampling port.

In some embodiments, the thread includes an internal thread of a female connector of the urine-sampling port.

In some embodiments, the thread includes a thread pattern having three leads.

In some embodiments, the thread includes a left-handed thread pattern.

Also disclosed is a sampling-port access device including, in some embodiments, a barrel, a hollow needle including a tip, and a tip at an end of the barrel. The needle is coaxially disposed within the barrel such that the tip of the needle is protected by the barrel. The tip at the end of the barrel is fluidly connected to the needle. The tip at the end of the barrel has a thread with a left-handed thread pattern, a thread pattern in which a first lead has a lead diameter greater than a second lead, a thread pattern having more than two leads, or a left-handed thread pattern having more than two leads. The tip at the end of the barrel is configured to mate with a complementary thread of a sampling port of another device. The complementary thread ensures proper mating of the sampling-port access device and the sampling port of the other device for aseptic sampling.

In some embodiments, the thread includes an internal thread of a lock ring or a lock collar around a male connector of the tip of the sampling-port access device.

In some embodiments, the lock ring is either non-rotatably attached to the barrel or molded with the barrel. The sampling-port access device is configured to mate with a sampling port of another device by screwing a whole of the sampling-port access device onto the sampling port of the other device.

In some embodiments, the lock collar is rotatably attached to the barrel. The sampling-port access device is configured to mate with a sampling port of another device by screwing the lock collar of the sampling-port access device onto the sampling port of the other device while holding the barrel stationary.

In some embodiments, the thread includes an external thread about a male connector of the tip of the sampling-port access device.

In some embodiments, the thread includes a left-handed thread pattern having three leads.

DRAWINGS

FIG. 1 provides a schematic illustrating a urine-sampling system featuring complementary fastening means of a urine-sampling port of a catheter assembly and a sampling-port access device and in accordance with some embodiments.

Figure 2A:
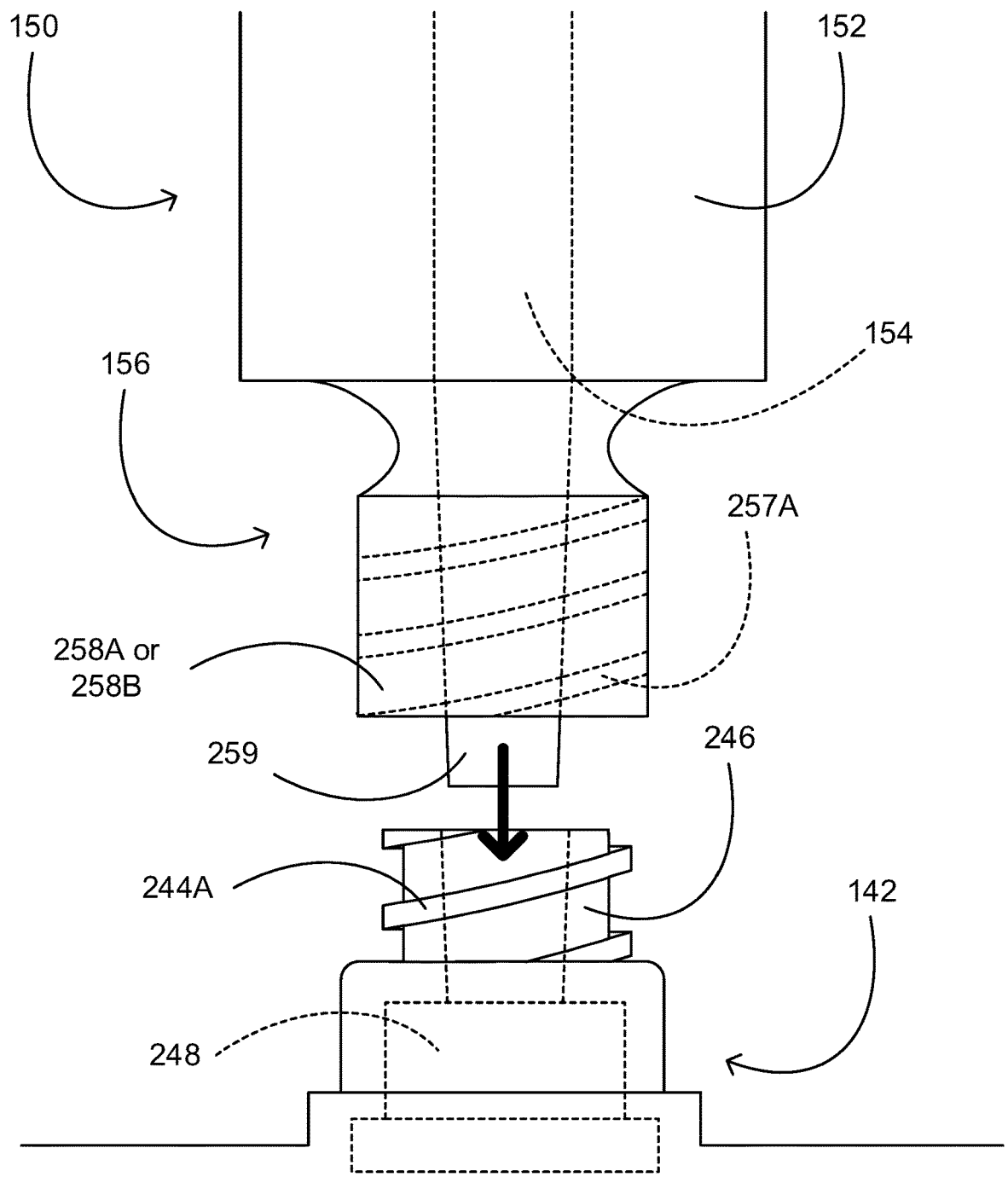

FIG. 2A provides a schematic illustrating an internal thread of a lock ring or a lock collar around a male connector of a tip of a sampling-port access device configured to mate with an external thread about a female connector of a urine-sampling port in accordance with some embodiments.

Figure 2B:
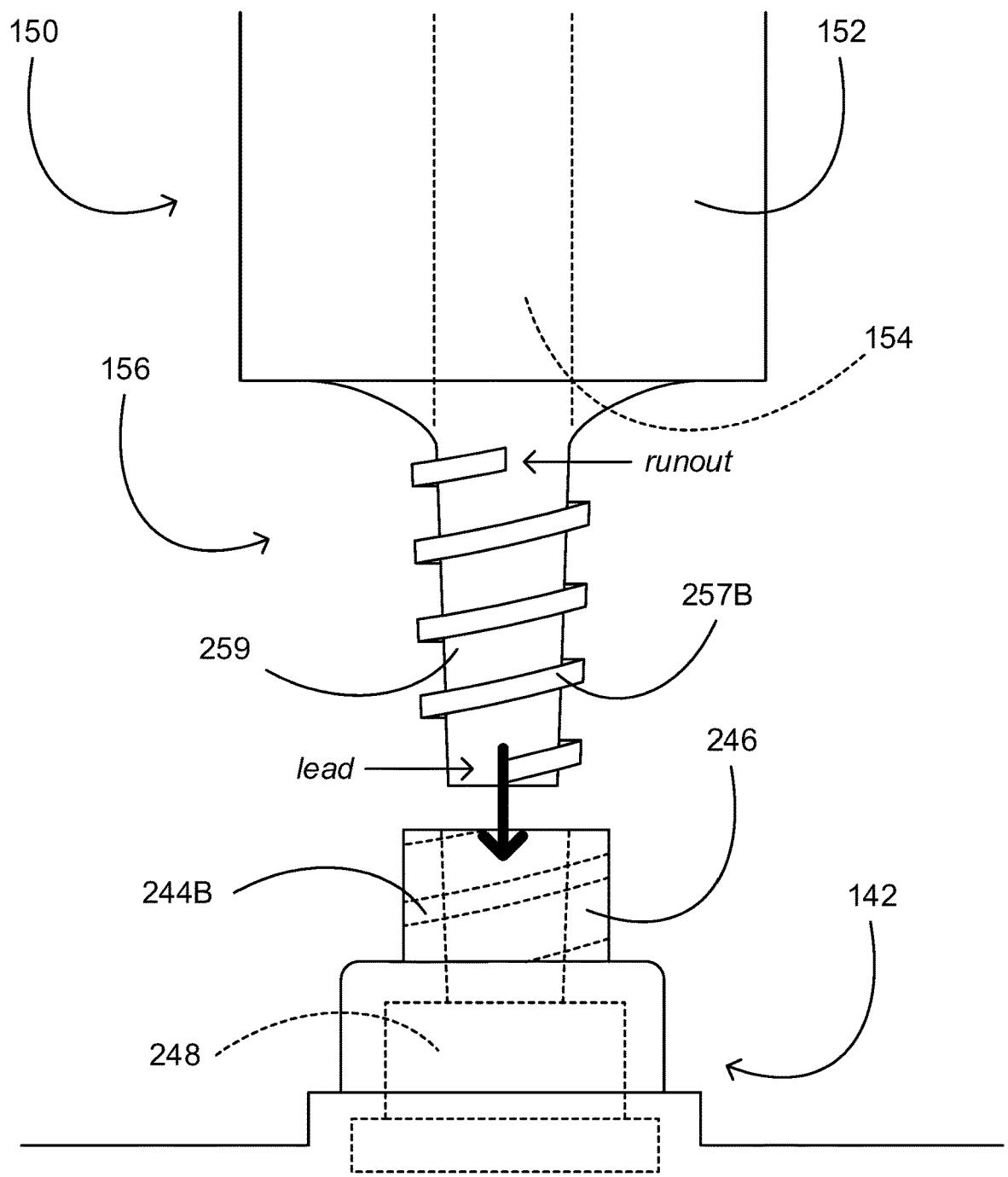

FIG. 2B provides a schematic illustrating an external thread about a male connector of a tip of a sampling-port access device configured to mate with an internal thread of a female connector of a urine-sampling port in accordance with some embodiments.

Figure 3B:
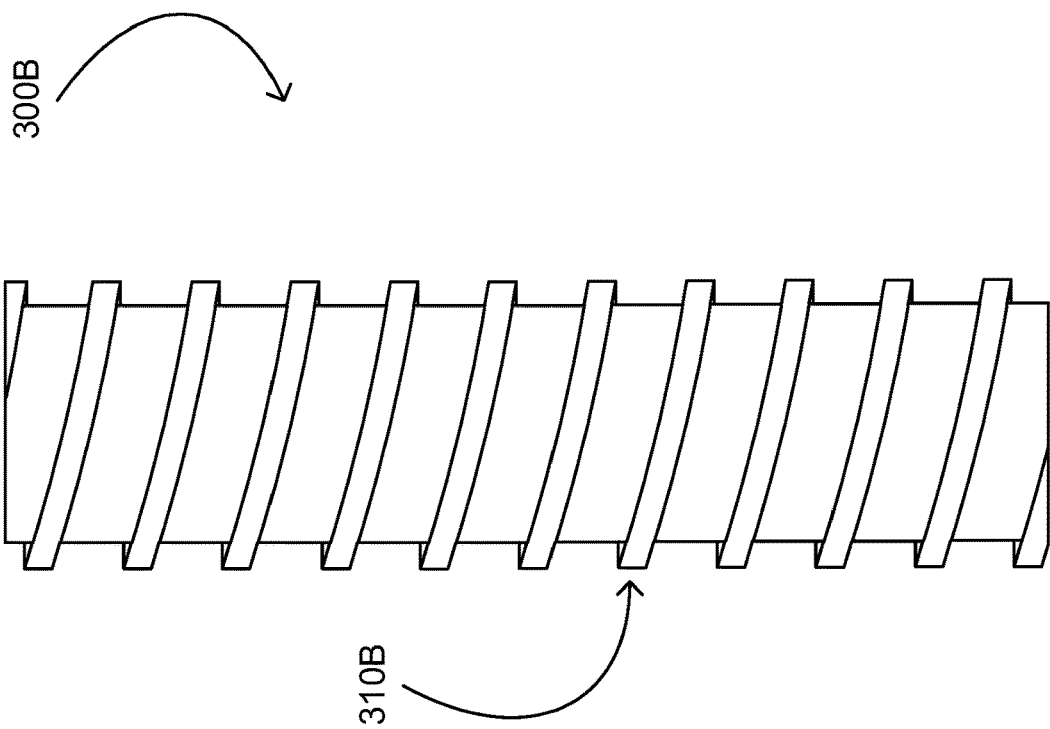
Figure 3A:
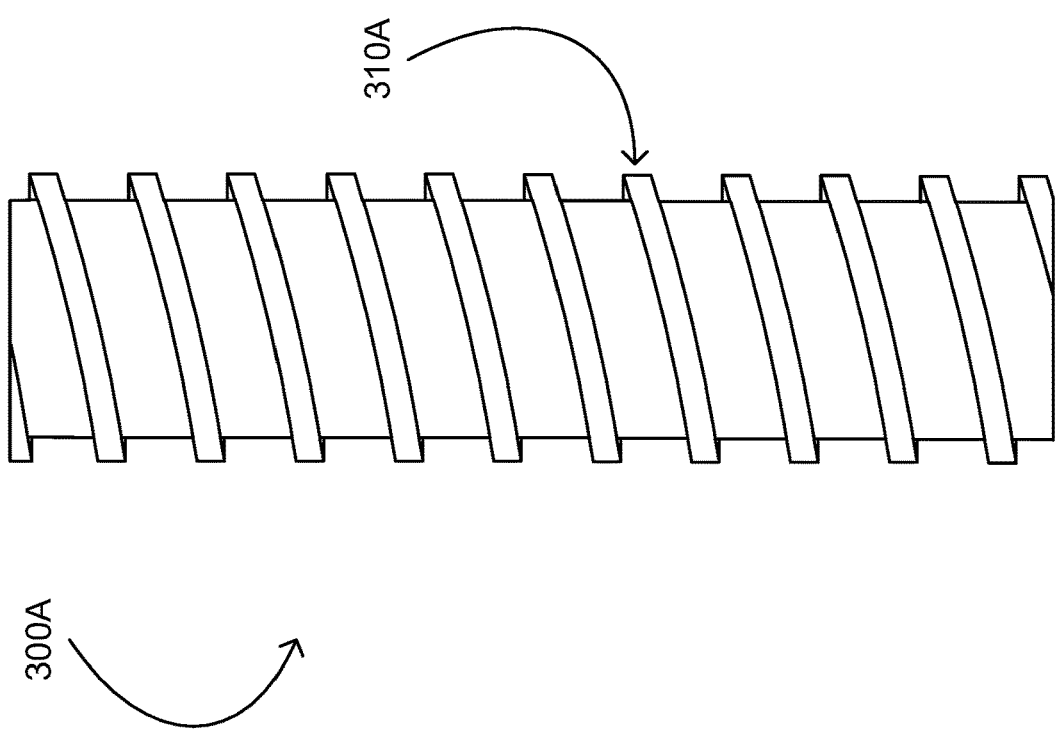

FIG. 3A provides a schematic illustrating a thread including a right-handed thread pattern in accordance with some embodiments.

FIG. 3B provides a schematic illustrating a thread including a left-handed thread pattern in accordance with some embodiments.

Figure 4A:
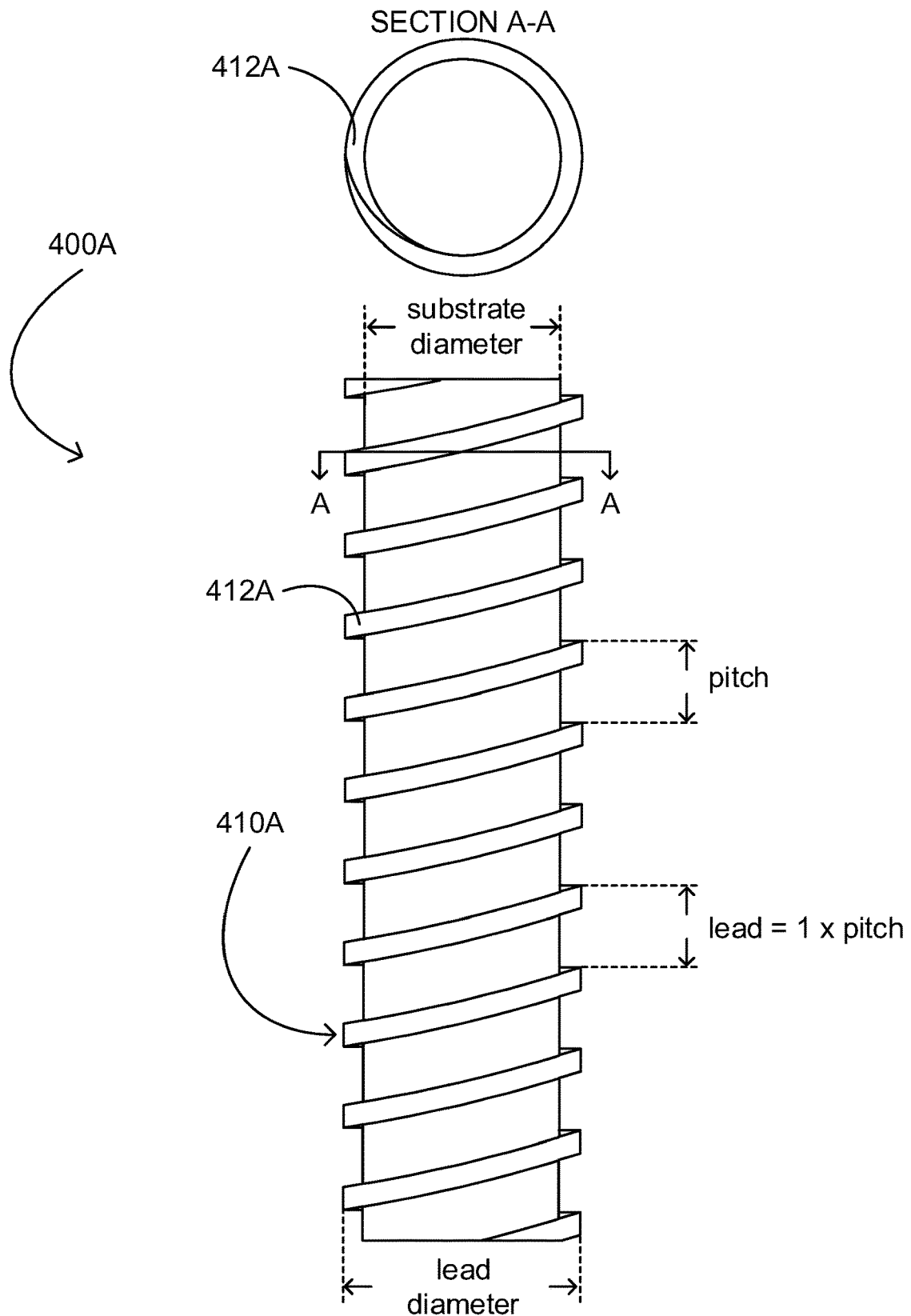

FIG. 4A provides a schematic illustrating a thread including a thread pattern having one lead in accordance with some embodiments.

Figure 4B:
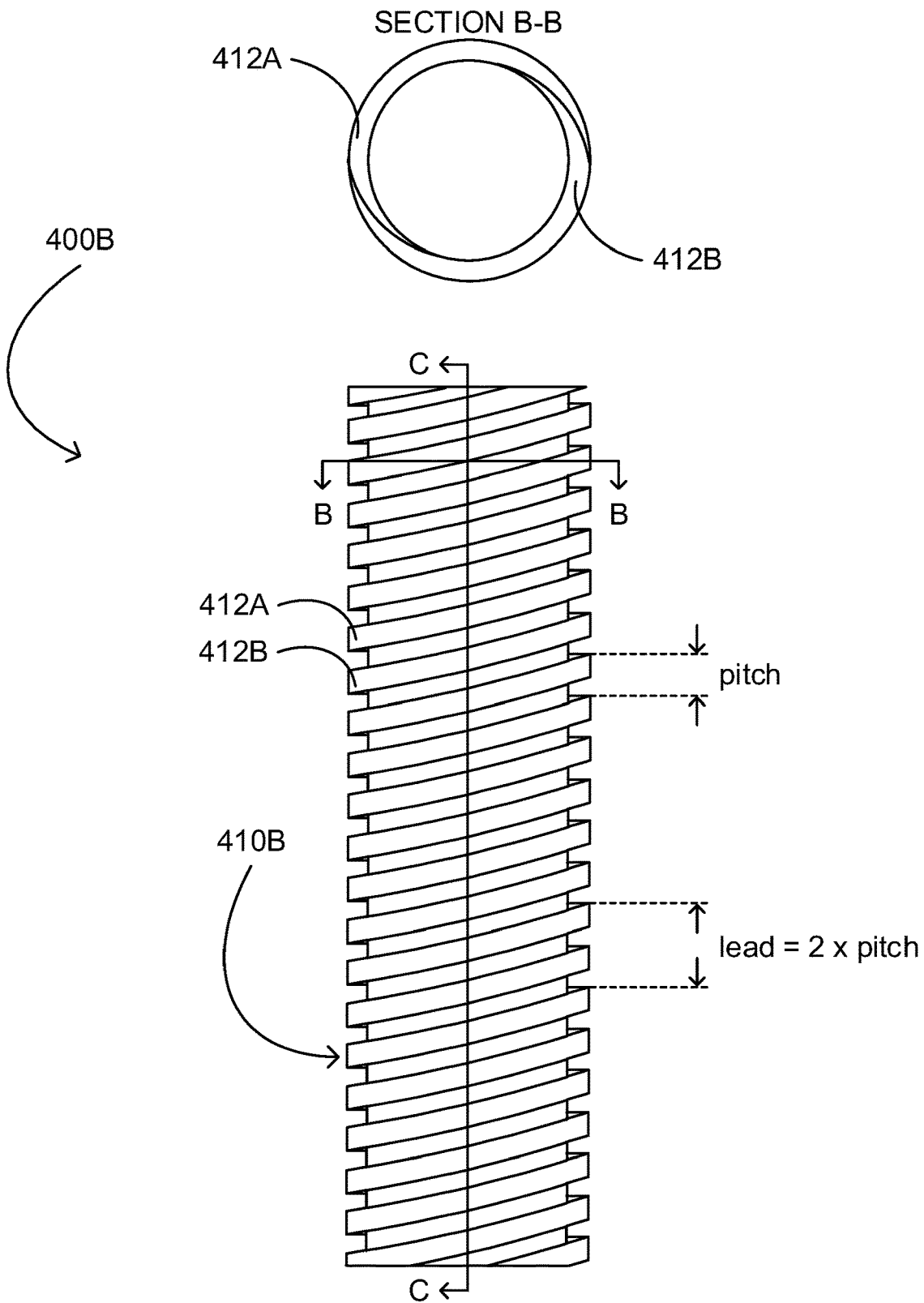

FIG. 4B provides a schematic illustrating a thread including a first thread pattern having two leads in accordance with some embodiments.

Figure 4C:
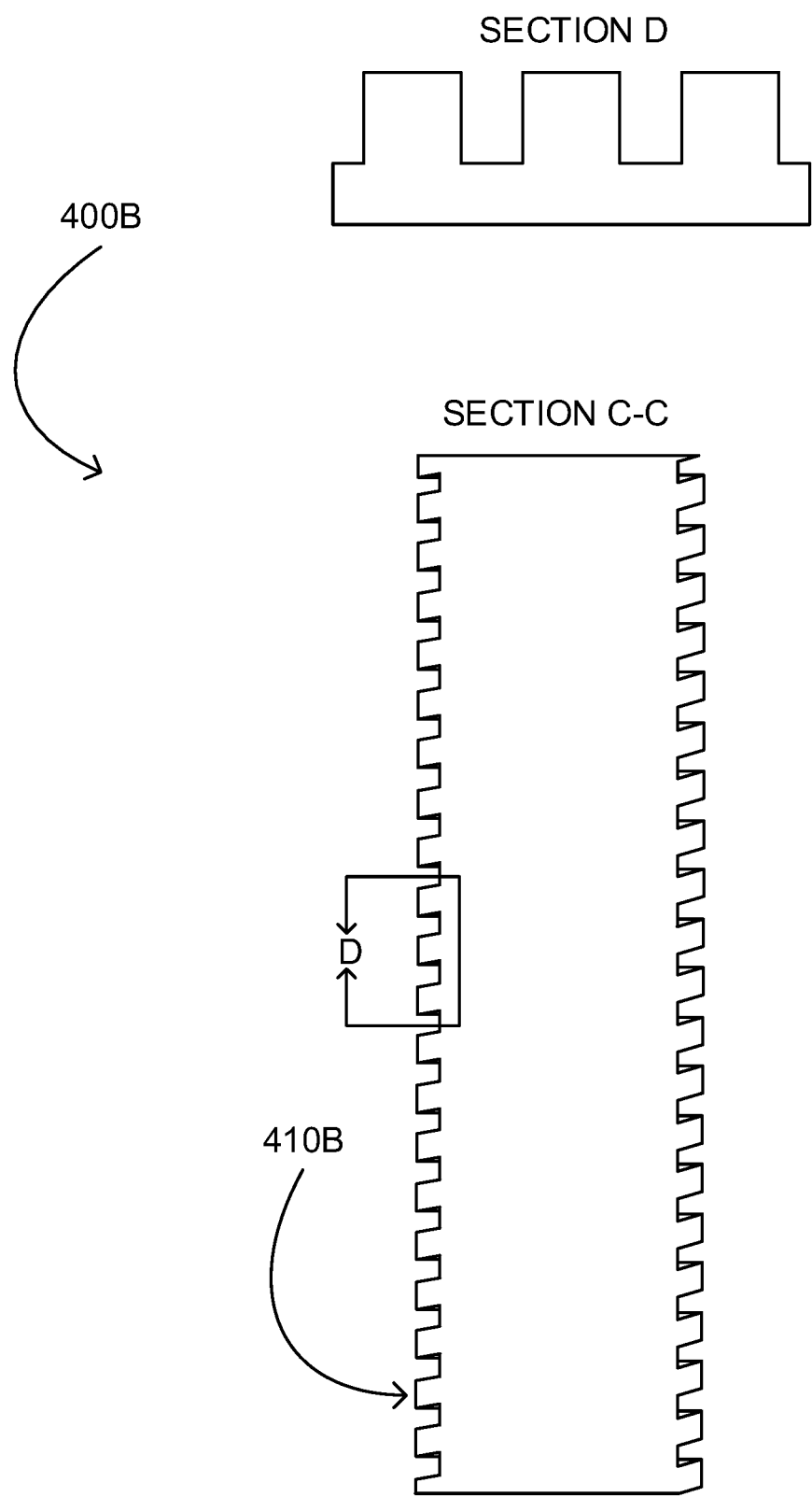

FIG. 4C provides a schematic illustrating in a cross-section of the first thread pattern having two leads accordance with some embodiments.

Figure 4D:
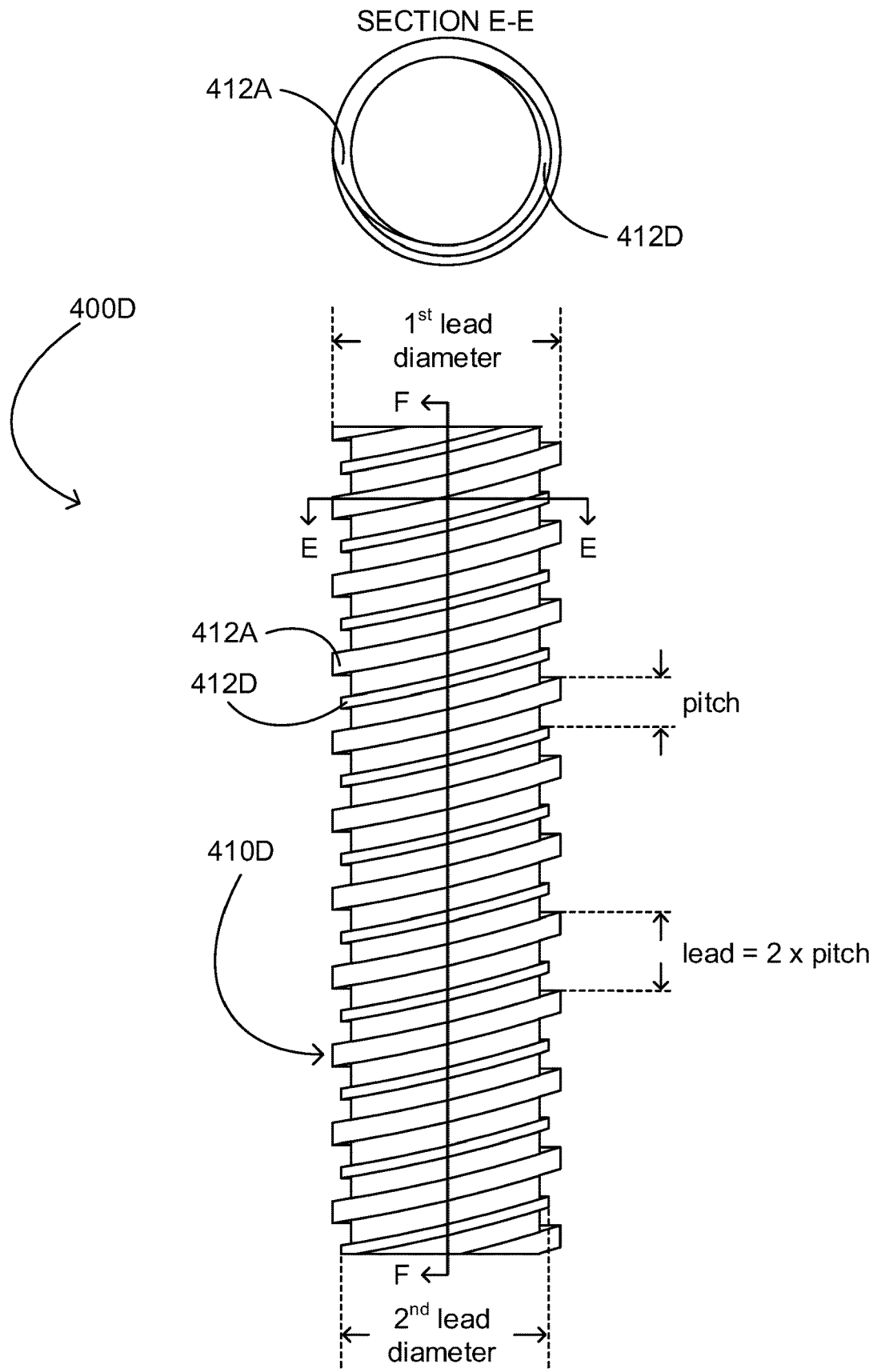

FIG. 4D provides a schematic illustrating a thread including a second thread pattern having two leads in accordance with some embodiments.

Figure 4E:
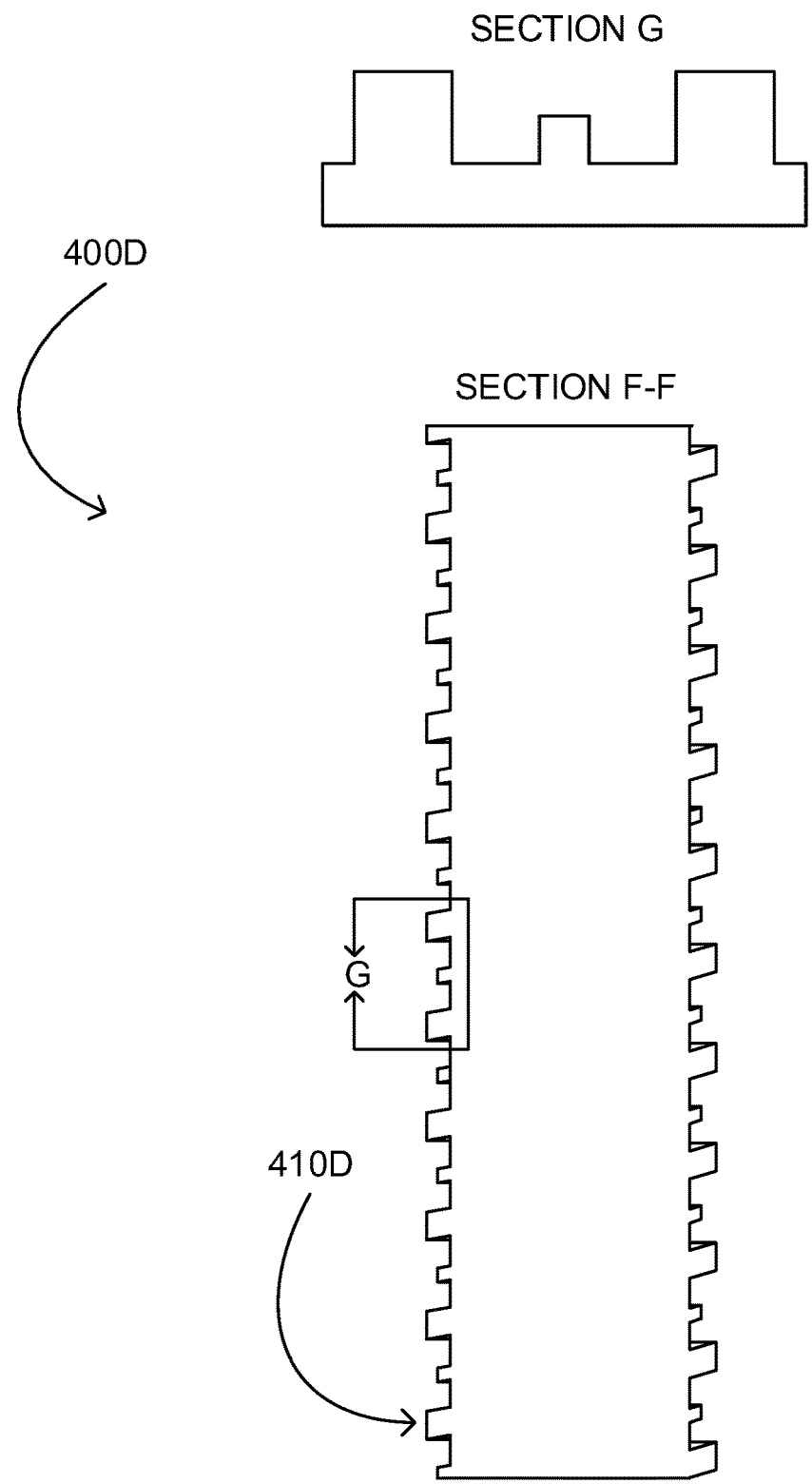

FIG. 4E provides a schematic illustrating a cross-section of the second thread pattern having two leads in accordance with some embodiments.

Figure 4F:
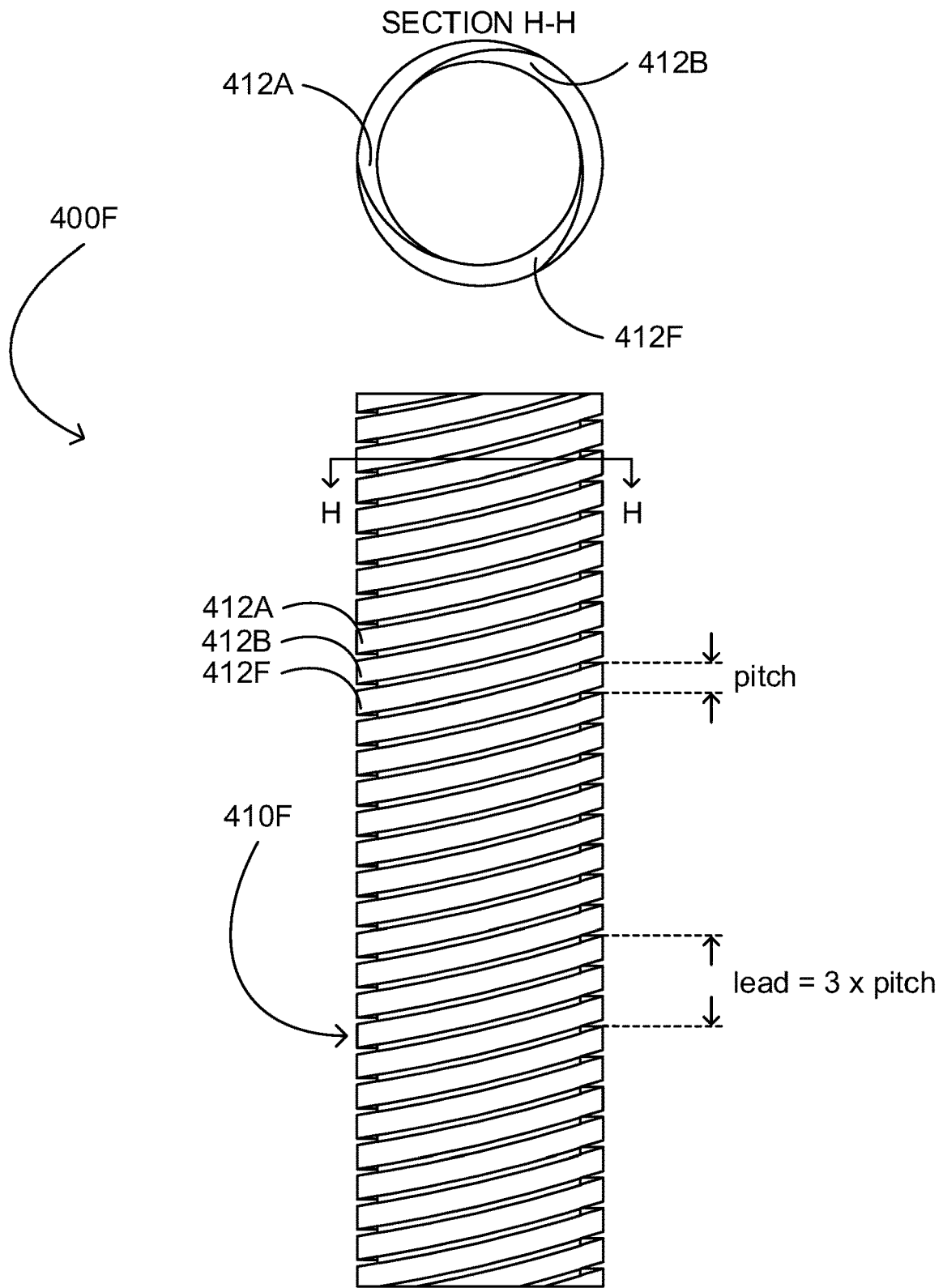

FIG. 4F provides a schematic illustrating a thread including a thread pattern having threes leads in accordance with some embodiments.

Figure 5B:
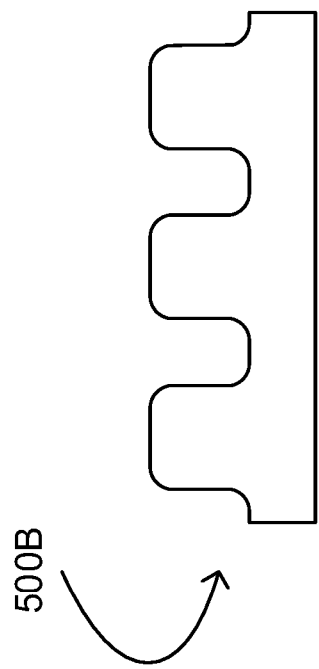
Figure 5D:
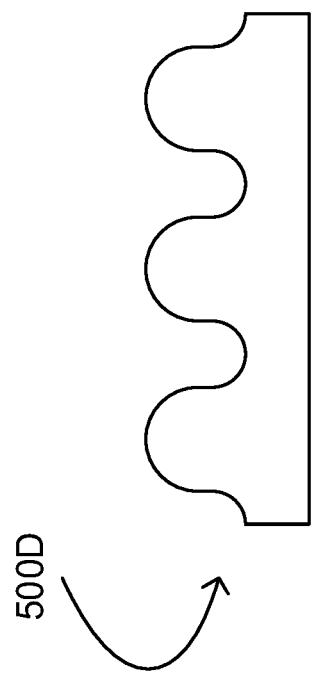
Figure 5A:
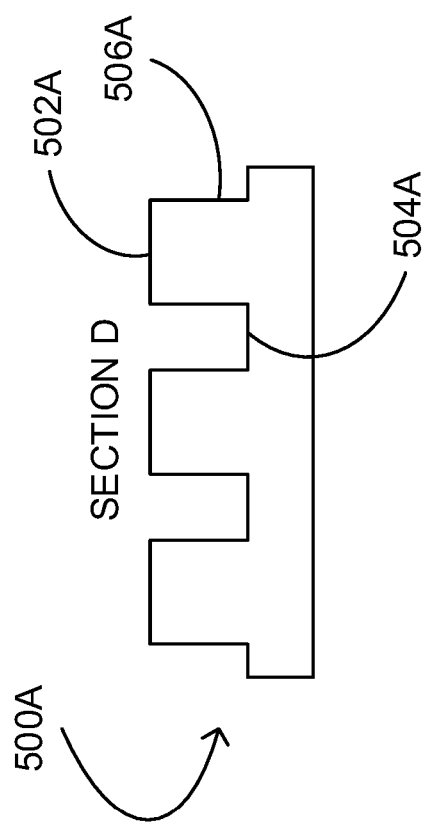

FIG. 5A provides a schematic illustrating a first thread form in accordance with some embodiments.

FIG. 5B provides a schematic illustrating a second thread form in accordance with some embodiments.

Figure 5C:
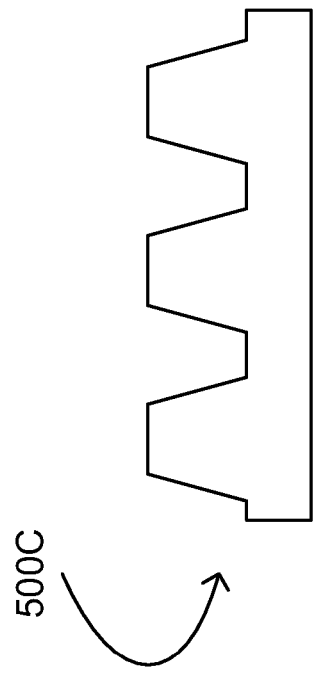

FIG. 5C provides a schematic illustrating a third thread form in accordance with some embodiments.

FIG. 5D provides a schematic illustrating a fourth thread form in accordance with some embodiments.

Figure 5F:
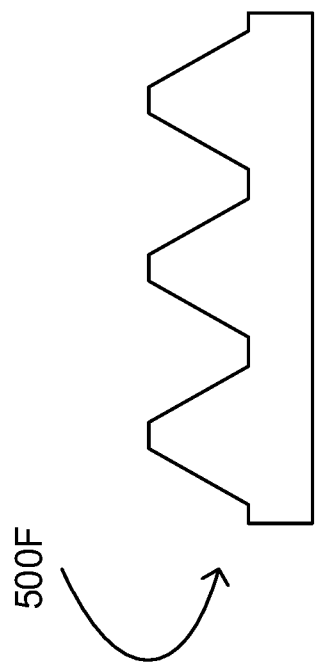
Figure 5H:
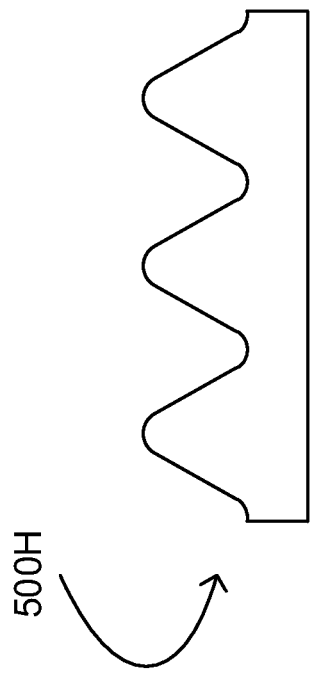
Figure 5E:
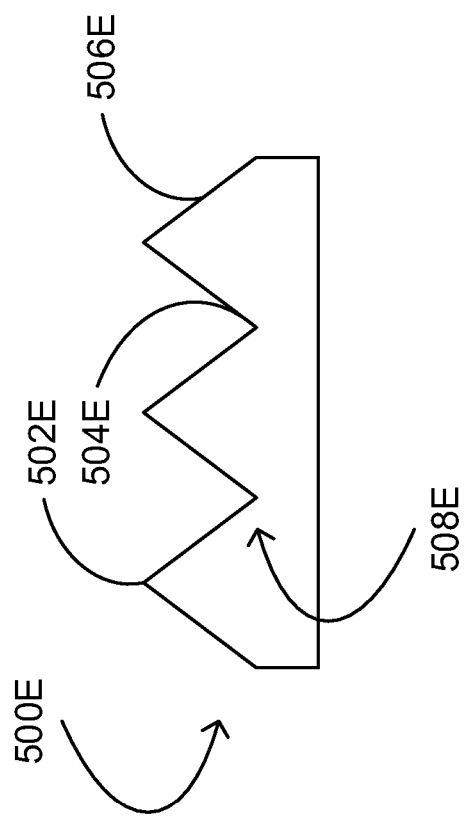

FIG. 5E provides a schematic illustrating a fifth thread form in accordance with some embodiments.

FIG. 5F provides a schematic illustrating a sixth thread form in accordance with some embodiments.

Figure 5G:
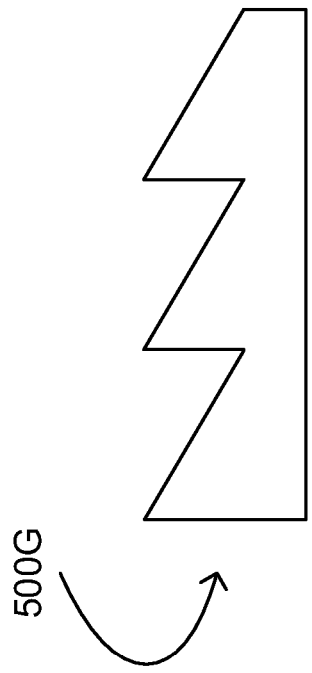

FIG. 5G provides a schematic illustrating a seventh thread form in accordance with some embodiments.

FIG. 5H provides a schematic illustrating an eighth thread form in accordance with some embodiments.

Figure 5I:
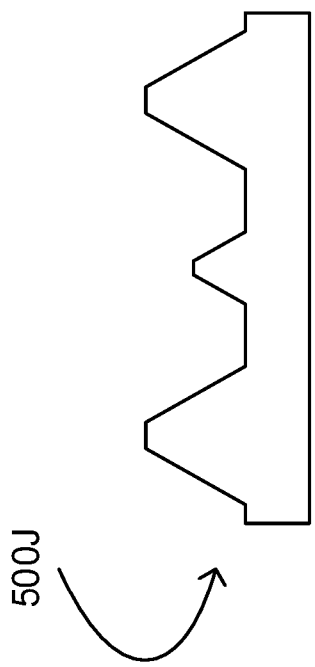

FIG. 5I provides a schematic illustrating a ninth thread form in accordance with some embodiments.

Figure 5J:
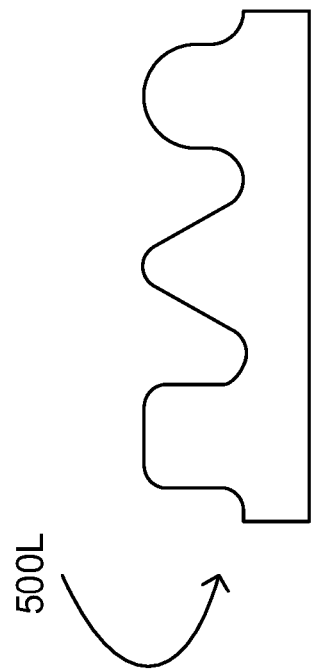

FIG. 5J provides a schematic illustrating a tenth thread form in accordance with some embodiments.

Figure 5K:
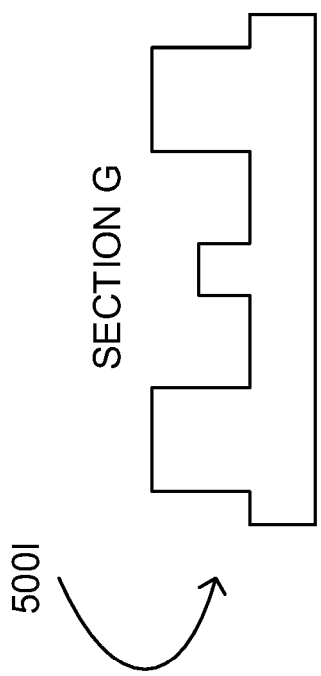

FIG. 5K provides a schematic illustrating an eleventh thread form in accordance with some embodiments.

Figure 5L:
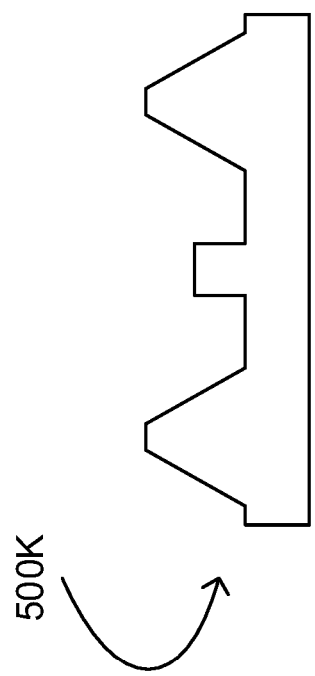

FIG. 5L provides a schematic illustrating a twelfth thread form in accordance with some embodiments.

DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

With respect to "proximal," a "proximal portion" or a "proximal end portion" of, for example, a catheter disclosed herein includes a portion of the catheter intended to be near a clinician when the catheter is used on a patient. Likewise, a "proximal length" of, for example, the catheter includes a length of the catheter intended to be near the clinician when the catheter is used on the patient. A "proximal end" of, for example, the catheter includes an end of the catheter intended to be near the clinician when the catheter is used on the patient. The proximal portion, the proximal end portion, or the proximal length of the catheter can include the proximal end of the catheter; however, the proximal portion, the proximal end portion, or the proximal length of the catheter need not include the proximal end of the catheter. That is, unless context suggests otherwise, the proximal portion, the proximal end portion, or the proximal length of the catheter is not a terminal portion or terminal length of the catheter.

With respect to "distal," a "distal portion" or a "distal end portion" of, for example, a catheter disclosed herein includes a portion of the catheter intended to be near or in a patient when the catheter is used on the patient. Likewise, a "distal length" of, for example, the catheter includes a length of the catheter intended to be near or in the patient when the catheter is used on the patient. A "distal end" of, for example, the catheter includes an end of the catheter intended to be near or in the patient when the catheter is used on the patient. The distal portion, the distal end portion, or the distal length of the catheter can include the distal end of the catheter; however, the distal portion, the distal end portion, or the distal length of the catheter need not include the distal end of the catheter. That is, unless context suggests otherwise, the distal portion, the distal end portion, or the distal length of the catheter is not a terminal portion or terminal length of the catheter.

Unless defined otherwise, all technical and scientific terms used herein have the same meaning as commonly understood by those of ordinary skill in the art.

When a patient catheterized with a urinary catheter requires a urine sample, the urine sample is collected in one of a number of different ways using one of a variety of different products to collect the urine sample. Typically, the urine sample is collected using a "clean" procedure, which is not aseptic and, thus, does not avoid contamination of the urine sample. It has been determined that such variation in urine sampling including where the urine sample is taken from a collection system, how the urine-sampling area is cleaned, what device is used to take the urine sample, and how the urine sample is transferred to the lab can lead to an increased risk of false-positive urine cultures. This, in turn, can lead to incorrect CAUTI diagnoses and inappropriate antibiotic treatments. As such, this variation in urine sampling is a fundamental issue presenting an ongoing challenge to those seeking to reduce CAUTI rates to avoid CMS reimbursement penalties. In addition, Centers for Disease Control ("CDC") guidelines state urine sampling from a urinary catheter should be performed using aseptic technique.

Disclosed are urine-sampling systems and methods thereof that address at least the foregoing. The urine-sampling systems described herein can be included in the urine-sampling kits disclosed in U.S. Provisional Application No. 62/675,112, filed May 22, 2018, and titled "Urine-Sampling Kit and Methods Thereof," which is incorporated by reference in its entirety into this application.

Urine-Sampling Systems

FIG. 1 provides a schematic illustrating a urine-sampling system 100 featuring complementary fastening means of a urine-sampling port 142 of a catheter assembly 110 and a sampling-port access device 150 in accordance with some embodiments.

As shown, the urine-sampling system 100 includes the catheter assembly 110 and the sampling-port access device 150. The catheter assembly 110 includes a urinary catheter 120, drainage tubing 132, and a connector 140 fluidly connecting the urinary catheter 120 to the drainage tubing 132. The connector 140 includes the urine-sampling port 142, which urine-sampling port 142 is shown in a generic form in view of the various embodiments thereof. The sampling-port access device 150 includes a barrel 152, a hollow needle 154 including a tip 155, and a tip 156 at an end of the barrel 152, which tip 156 at the end of the barrel 152 is shown in a generic form in view of the various embodiments thereof. The needle 154 is coaxially disposed within the barrel 152 such that the tip 155 of the needle 154 is protected by the barrel 152. The tip 156 at the end of the barrel 152 is fluidly connected to the needle 154. Each of the tip 156 of the sampling-port access device 150 and the urine-sampling port 142 has a complementary fastening means for fastening, or exclusively connecting, to the other of the tip 156 of the sampling-port access device 150 and the urine-sampling port 142. Each of the complementary fastening means ensures proper mating of the tip 156 of the sampling-port access device 150 and the urine-sampling port 142 for aseptic urine sampling.

Each of the tip 156 of the sampling-port access device 150 and the urine-sampling port 142 can match a color of the other of the tip 156 of the sampling-port access device 150 and the urine-sampling port 142. Such a color can be exclusive to the urine-sampling system 100. The color of the tip 156 of the sampling-port access device 150 and the urine-sampling port 142 being matched, especially when the color is exclusive to the urine-sampling system 100, reduces a risk of urine-sample contamination by any attempted misconnection of the tip 156 of the sampling-port access device 150 or the urine-sampling port 142 to, for example, another piece including a fastening means that is part of the Luer-lock fastening system.

While not shown in FIG. 1, the urine-sampling system 100 further includes one or more septum-stoppered test tubes in accordance with some embodiments. Each test tube of the one or more test tubes has an outer diameter nearly commensurate with or somewhat smaller than an inner diameter of the barrel 152 of the sampling-port access device 150. Having such dimensions, a test tube is allowed to slide into the barrel 152 to pierce the septum stopper of the test tube with the needle 154 of the sampling-port access device 150 for urine sampling. Each test tube of the one or more test tubes is evacuated to have an internal pressure less than atmospheric pressure. When urine is present within the connector 140, an evacuated test tube is inserted into the barrel 152 of the sampling-port access device 150, and the septum stopper of the test tube is pierced with the needle 154 disposed in the barrel 152, the urine is drawn into the test tube by way of the needle 154, which is hollow to provide a fluid conduit between the connector 140 and the test tube. Each test tube of the one or more test tubes is also independently configured to include therein a formulation for urinalysis, a formulation for microbiological analysis, or no additives or preservatives. Such formulations allow urine samples to be stored for a number of hours without refrigeration.

Fastening System

Complementary fastening means form a fastening system. A fastening means is a complementary fastening means when it complements another fastening means for assembly of two pieces each including one of the complementary fastening means, during assembly of the two pieces including the complementary fastening means, or in at least a partial assembly of the two pieces including the complementary fastening means. For example, the fastening means of either the urine-sampling port 142 of the connector 140 or the tip 156 of the sampling-port access device 150 is a complementary fastening means of the other for assembling the connector 140 and the sampling-port access device 150 for aseptic urine sampling.

A fastening means includes, but is not limited to, a thread of a thread-containing piece. A thread is a complementary thread (e.g., a complementary external thread) when it complements another thread (e.g., a complementary internal thread) for assembly of two pieces each including one of the complementary threads, during assembly of the two pieces including the complementary threads, or in at least a partial assembly of the two pieces including the complementary threads. For example, the thread of either the urine-sampling port 142 of the connector 140 or the tip 156 of the sampling-port access device 150 is a complementary thread of the other for assembling the connector 140 and the sampling-port access device 150 for aseptic urine sampling.

A fastening means is not part of the Luer-lock fastening system, which is a standard fastening system of the medical industry defined under ISO 80369-7:2016. As such, a fastening means does not include either thread of the complementary threads found in a pair of pieces configured to connect by way of the Luer-lock fastening system. Indeed, fastening means of the fastening system disclosed herein are intentionally differentiated from those of the Luer-lock fastening system. This allows for enhanced mechanical integrity in the instant fastening system over that of the Luer-lock fastening system, which enhanced mechanical integrity includes at least reduced precessional motion, or "wobbling," over that of the Luer-lock fastening system when assembling any two pieces including complementary fastening means of the fastening system. The enhanced mechanical integrity is anticipated to reduce fumbling and, thus, contamination-inducing acts when clinicians use the fastening system. Fluid-seal integrity is also enhanced in the instant fastening system over that of the Luer-lock fastening system, which is further anticipated to reduce contamination-inducing acts when clinicians use the fastening system.

FIG. 2A provides a schematic illustrating an internal thread 257A of a lock ring 258A or a lock collar 258B around a male connector 259 of the tip 156 of the sampling-port access device 150 configured to mate with an external thread 244A about a female connector 246 of the urine-sampling port 142 in accordance with some embodiments.

As shown, the complementary fastening means of the tip 156 of the sampling-port access device 150 thus includes, in some embodiments, a complementary thread in which the internal thread 257A of the lock ring 258A or the lock collar 258B around the male connector 259 is configured to mate with the external thread 244A about the female connector 246 of the urine-sampling port 142. The complementary fastening means of the urine-sampling port 142 thus includes, in corresponding embodiments, a complementary thread in which the external thread 244A about the female connector 246 of the urine-sampling port 142 is configured to mate with the internal thread 257A of the lock ring 258A or the lock collar 258 around the male connector 259 of the sampling-port access device 150. Each of the complementary fastening means ensures proper mating of the tip 156 of the sampling-port access device 150 and the urine-sampling port 142 for aseptic urine sampling.

With respect to the lock ring 258A, the lock ring 258A is either fixedly and non-rotatably attached to the barrel 152 of the sampling-port access device 150 or molded with the barrel 152 in a so-called one-piece design. Configured with such a lock ring 258A, the sampling-port access device 150 is configured to mate with a sampling port of another device (e.g., the urine-sampling port 142 of the connector 140) by screwing a whole of the sampling-port access device 150 onto the sampling port of the other device.

With respect to the lock collar 258B, the lock collar 258B is rotatably attached to the barrel 152 of the sampling-port access device 150 in a so-called two-piece design. The sampling-port access device 150 is configured to mate with a sampling port of another device (e.g., the urine-sampling port 142 of the connector 140) by screwing the lock collar 258B of the sampling-port access device 150 onto the sampling port of the other device while holding the barrel 152 of the sampling-port access device 150 stationary.

FIG. 2B provides a schematic illustrating an external thread 257B about the male connector 259 of the tip 156 of the sampling-port access device 150 configured to mate with an internal thread 244B of the female connector 246 of the urine-sampling port 142 in accordance with some embodiments.

As shown, the complementary fastening means of the tip 156 of the sampling-port access device 150 thus includes, in some embodiments, a complementary thread in which the external thread 257B about the male connector 259 is configured to mate with the internal thread 244B of the female connector 246 of the urine-sampling port 142. The complementary fastening means of the urine-sampling port 142 thus includes, in corresponding embodiments, a complementary thread in which the internal thread 244B of the female connector 246 of the urine-sampling port 142 is configured to mate with the external thread 257B about the male connector 259 of the sampling-port access device 150. Again, each of the complementary fastening means ensures proper mating of the tip 156 of the sampling-port access device 150 and the urine-sampling port 142 for aseptic urine sampling.

In addition to the complementary fastening means of each of the tip 156 of the sampling-port access device 150 and the urine-sampling port 142 shown in FIGS. 2A and 2B, each of the male connector 259 of the tip 156 of the sampling-port access device 150 and the female connector 246 of the urine-sampling port 142 is configured with a size and a shape to ensure proper mating of the tip 156 of the sampling-port access device 150 and the urine-sampling port 142 for aseptic urine sampling. Each of the male connector 259 and the female connector 246 can be respectively sized with a length and a depth to allow sufficient engagement of an end portion of the male connector 259 with a valve 248 (e.g., split-septum valve) disposed within the urine-sampling port 142 of the connector 140. Each of the male connector 259 and the female connector 246 can be shaped to create a fluid-tight seal between the male connector 259 and the female connector 246 when the male connector 259 is sufficiently engaged with the valve 248 of the urine-sampling port 142 of the connector 140.

With respect to the shape of the male connector 259 of the tip 156 of the sampling-port access device 150 and the female connector 246 of the urine-sampling port 142, each of the male connector 259 and the female connector 246 can be shaped to match or not match the other of the male connector 259 and the female connector 246. Sometimes, a slight mismatch such as a greater taper of the male connector 259 than the female connector 246 is desired when a first material (e.g., a harder material) is used for the male connector 259 and a second, different material (e.g., a softer material) is used for the female connector 246. Thus, each of the male connector 259 and the female connector 246 can independently be tapered or not tapered. In some embodiments, when the male connector 259 or the female connector 246 is tapered, the taper is at least a 1%, 2%, 3%, 4%, 5%, 6%, 7%, 8%, 9%, or 10% taper. In some embodiments, when the male connector 259 or the female connector 246 is tapered, the taper is no more than a 10%, 9%, 8%, 7%, 6%, 5%, 4%, 3%, 2%, or 1% taper. Accordingly, in some embodiments, when the male connector 259 or the female connector 246 is tapered, the taper is at least a 1% and no more than 10% taper, including at least a 3% and no more than 9% taper, such as at least a 4% and no more than 8% taper, for example, at least a 5% and no more than 7% taper.

Each of the urine-sampling port 142 of the connector 140 of the catheter assembly 110 and the tip 156 at the end of the barrel 152 of the sampling-port access device 150 is shown in a generic form in in FIG. 1 in view of the various embodiments of the fastening means thereof. FIGS. 2A and 2B provide some additional details with respect to such fastening means. For example, FIG. 2A provides a complementary internal thread 257A of the lock ring 258A or the lock collar 258B around the male connector 259 of the tip 156 of the sampling-port access device 150 configured to mate with a complementary external thread 244A about the female connector 246 of the urine-sampling port 142 in accordance with some embodiments. And, for example, FIG. 2B provides a complementary external thread 257B about the male connector 259 of the tip 156 of the sampling-port access device 150 configured to mate with a complementary internal thread 244B of the female connector 246 of the urine-sampling port 142 in accordance with some embodiments.

As set forth below, FIGS. 3A-3B, 4A-4F, and 5A-5L provide further details with respect to the complementary threads of FIGS. 2A and 2B including various thread patterns and thread forms thereof, any combination of which is possible. FIGS. 3A and 3B provide schematics illustrating substrates having thread patterns with different handedness. FIGS. 4A-4F provide schematics illustrating substrates having thread patterns with one or more leads. FIGS. 5A-5L provide schematics illustrating various thread forms for threads. While only external threads are shown in FIGS. 3A, 3B, 4A-4F, and 5A-5L, it should be understood that complementary internal threads exist as well. Furthermore, each substrate of the referenced substrates can independently be, for example, an internal surface of the lock ring 258A or the lock collar 258B of the tip 156 of the sampling-port access device 150, an external surface of the male connector 259 of the tip 156 of the sampling-port access device 150, or an external or internal surface of the female connector 246 of the urine-sampling port 142 of the connector 140.

Thread Patterns

FIG. 3A provides a schematic illustrating a substrate 300A including a thread 310A having a right-handed thread pattern in accordance with some embodiments.

Two pieces having complementary threads with a right-handed thread pattern such as that shown in FIG. 3A assemble when one piece of the two pieces is driven onto or into the other piece of the two pieces in a clockwise direction by way of the complementary threads. For example, when a first piece such as the tip 156 of the sampling-port access device 150 and a second piece such as the urine-sampling port 142 of the connector 140 have complementary right-handed threads, the tip 156 of the sampling-port access device 150 is driven onto or into the urine-sampling port 142 in a clockwise direction by way of the complementary right-handed threads.

FIG. 3B provides a schematic illustrating a substrate 300B having a thread 310B including a left-handed thread pattern in accordance with some embodiments.

Two pieces having complementary threads with the left-handed thread pattern such as that shown in FIG. 3B assemble when one piece of the two pieces is driven onto or into the other piece of the two pieces in a counterclockwise direction by way of the complementary threads. For example, when a first piece such as the tip 156 of the sampling-port access device 150 and a second piece such as the urine-sampling port 142 of the connector 140 have complementary left-handed threads, the tip 156 of the sampling-port access device 150 is driven onto or into the urine-sampling port 142 in a counterclockwise direction by way of the complementary left-handed threads.

FIG. 4A provides a schematic illustrating a substrate 400A with a thread 410A having a thread pattern including one lead in accordance with some embodiments.

As shown, the one lead of the thread 410A includes lead 412A, which can have a thread form such as that shown in FIG. 4A or any thread form such as any one of the thread forms of FIGS. 5A-5H. The lead 412A has a lead diameter greater than a substrate diameter of the substrate 400A. Generally, the difference between a lead diameter of a lead and a substrate diameter of a substrate is the height or the depth of the lead. For example, the difference between the lead diameter, or "major diameter," of the lead 412A and the substrate diameter, or "minor diameter," of the substrate 400A is the height of the lead 412A. The height or depth is found by difference regardless of whether the substrate is cylindrical like the substrate 400A of FIG. 4A or tapered like the male connector 259 of the tip 156 of the sampling-port access device 150. The height or depth of a lead can vary depending upon several factors. For example, a thickness of a substrate in which a lead is threaded is a factor in how deep the thread can be threaded without a loss of structural integrity in the substrate.

As further shown, the thread 410A also has a pitch, which is a distance between adjacent, similar points or locations such as adjacent crests or roots of a thread. (See FIG. 5E for identification of a crest and a root in a thread.) In the case of the thread 410A, which has the one lead (i.e., the lead 412A), the pitch is the distance between, for example, adjacent crests of the lead 412A. The thread 410A also has a lead pitch, or "lead," which is a distance between adjacent, similar points or locations (e.g., adjacent crests, roots, etc.) of a lead. In the case of the thread 410A, which has the one lead (i.e., the lead 412A), the lead pitch is the distance between, for example, adjacent crests of the lead 412A. As such, the pitch of the thread 410A and the lead pitch of the lead 412A are the same, but this is not always the case as shown in FIGS. 4B, 4C, and 4D.

FIG. 4B provides a schematic illustrating a substrate 400B with a thread 410B having a first thread pattern including two leads in accordance with some embodiments. FIG. 4D provides a schematic illustrating a substrate 400D with a thread 410D having a second thread pattern including two leads in accordance with some embodiments.

As shown, the two leads of the thread 410B include the lead 412A and an additional lead 412B. Likewise, the two leads of the thread 410D include the lead 412A and an additional lead 412D. However, while the two leads of the thread 410B are substantially similar with respect to their relative size and thread form, the two leads of the thread 410D are different with respect to at least their relative size. Indeed, each lead of the two leads of the thread 410B or the thread 410D can independently be configured with a relative size and a thread form such as any one thread form of the thread forms of FIGS. 5A-5H. As such, the two leads of a two-lead thread such as the thread 410B can be substantially similar as shown in FIG. 4B, or the two leads in a two-lead thread such as the thread 410D can be different with respect to relative size, thread form, or a combination thereof (see, for example, FIGS. 5I-5K).

Again, the difference between a lead diameter of a lead and a substrate diameter of a substrate is the height or the depth of the lead. For example, the difference between the lead diameter of the lead 412A and the substrate diameter of the substrate 400B is the height of the lead 412A, and the difference between the lead diameter of the lead 412B and the substrate diameter of the substrate 400B is the height of the lead 412B. As shown in FIG. 4B, the heights of the leads 412A and 412B are substantially similar. For another example, the difference between the lead diameter of the lead 412A and the substrate diameter of the substrate 400D is the height of the lead 412A, and the difference between the lead diameter of the lead 412D and the substrate diameter of the substrate 400D is the height of the lead 412D. As shown in FIG. 4D, however, the heights of the leads 412A and 412D are different in that the height of the lead 412A is greater than the height of the lead 412D. Again, the height or depth of a lead can vary depending upon several factors. For example, a thickness of a substrate in which a lead is threaded is a factor in how deep the deepest thread of two or more threads can be threaded without a loss of structural integrity in the substrate.

As further shown, each thread of the threads 410B and 410D also has a pitch, which, again, is a distance between adjacent, similar points or locations such as adjacent crests or roots of a thread. In the case of the thread 410B, which has two leads (i.e., the lead 412A and the lead 412B), the pitch is the distance between, for example, a crest of the lead 412A and an adjacent crest of the lead 412B. Likewise, the pitch of the thread 410D is the distance between, for example, a crest of the lead 412A and an adjacent crest of the lead 412D. Each thread of the threads 410B and 410D also has a lead pitch, which, again, is a distance between adjacent, similar points or locations (e.g., adjacent crests, roots, etc.) of a lead. In the case of the thread 410B, which has two leads (i.e., the lead 412A and the lead 412B), the lead pitch of the lead 412A is the distance between, for example, adjacent crests of the lead 412A, and the lead pitch of the lead 412B is the distance between, for example, adjacent crests of the lead 412B. Likewise, in the case of the thread 410D, the lead pitch of the lead 412A is the distance between, for example, adjacent crests of the lead 412A, and the lead pitch of the lead 412D is the distance between, for example, adjacent crests of the lead 412D. As shown in either FIG. 4B or 4D, the pitch of a thread can be half the lead pitch of a lead of the thread when the thread has two leads such as either the thread 410B or the thread 410D.

FIG. 4F provides a schematic illustrating a substrate 400F with a thread 410F having a thread pattern including three leads in accordance with some embodiments.

As shown, the three leads of the thread 410F include the lead 412A, the lead 412B, and an additional lead 412F. While the three leads of the thread 410F are substantially similar with respect to their relative size and thread form, each lead of the three leads of the thread 410D can independently be configured with a relative size and a thread form such as any one thread form of the thread forms of FIGS. 5A-5H. As such, all three leads of a three-lead thread such as the thread 410F can be substantially similar as shown in FIG. 4F, any two leads in a three-lead thread can be substantially similar while the third lead of the thread is different with respect to relative size, thread form, or a combination thereof (see, for example, FIGS. 5I-5K), or all three leads in a three-lead thread can be different with respect to relative size, thread form, or a combination thereof (see, for example, FIG. 5L).

Again, the difference between a lead diameter of a lead and a substrate diameter of a substrate is the height or the depth of the lead. For example, the difference between the lead diameter of the lead 412A and the substrate diameter of the substrate 400F is the height of the lead 412A, the difference between the lead diameter of the lead 412B and the substrate diameter of the substrate 400F is the height of the lead 412B, and the difference between the lead diameter of the lead 412F and the substrate diameter of the substrate 400F is the height of the lead 412F. As shown in FIG. 4F, the heights of the leads 412A, 412B, and 412F are substantially similar. However, as with the heights of the leads 412A and 412D of the thread 410D of FIG. 4D, the heights of any two leads in a three-lead thread can be substantially similar while the height of the third lead of the thread is different (see, for example, FIGS. 5I-5K), or the heights of all three leads in a three-lead thread can be different. Again, the height or depth of a lead can vary depending upon several factors. For example, a thickness of a substrate in which a lead is threaded is a factor in how deep the deepest thread of three or more threads can be threaded without a loss of structural integrity in the substrate.

As further shown, the thread 410F also has a pitch, which, again, is a distance between adjacent, similar points or locations such as adjacent crests or roots of a thread. In the case of the thread 410F, which has three leads (i.e., the lead 412A, the lead 412B, and the lead 412F), the pitch is the distance between, for example, a crest of the lead 412A and an adjacent crest of the lead 412B. Each thread of the threads 410A, 410B, and 410F also has a lead pitch, which, again, is a distance between adjacent, similar points or locations (e.g., adjacent crests, roots, etc.) of a lead. In the case of the thread 410F, which has three leads (i.e., the lead 412A, the lead 412B, and the lead 412F), the lead pitch of the lead 412A is the distance between, for example, adjacent crests of the lead 412A, the lead pitch of the lead 412B is the distance between, for example, adjacent crests of the lead 412B, and the lead pitch of the lead 412F is the distance between, for example, adjacent crests of the lead 412F. As shown in FIG. 4F, the pitch of a thread can be a third of the lead pitch of a lead of the thread when the thread has three leads such as the thread 410F.

With respect to the pitch of a thread such as any one of the threads 410A, 410B, 410D, and 410F respectively of FIGS. 4A, 4B, 4D, and 4F, the pitch of the thread is, in some embodiments, at least 0.25 mm, 0.50 mm, 0.75 mm, 1.00 mm, 1.25 mm, 1.50 mm, 1.75 mm, 2.00 mm, 2.25 mm, 2.50 mm, 2.75 mm, 3.00 mm, 3.25 mm, 3.50 mm, 3.75 mm, 4.00 mm, 4.25 mm, 4.50 mm, 4.75 mm, or 5.00 mm. In some embodiments, the pitch of the thread is no more than 5.00 mm, 4.75 mm, 4.50 mm, 4.25 mm, 4.00 mm, 3.75 mm, 3.50 mm, 3.25 mm, 3.00 mm, 2.75 mm, 2.50 mm, 2.25 mm, 2.00 mm, 1.75 mm, 1.50 mm, 1.25 mm, 1.00 mm, 0.75 mm, 0.50 mm, or 0.25 mm. Accordingly, in some embodiments, the pitch of the thread is at least 0.25 mm and no more than 5.00 mm, including at least 0.50 mm and no more than 4.50 mm, such as at least 1.00 mm and no more than 4.00 mm, for example, at least 2.00 mm and no more than 3.00 mm. With respect to the lead pitch of a thread such as any one of the threads 410A, 410B, 410D, and 410F, the lead pitch of the thread is a multiple (e.g., 2×, 3×, 4×, etc.) of the any of the foregoing pitches or ranges of pitches depending up on the number of leads (e.g., 2, 3, 4, etc.) in the thread.

In view of the foregoing, the urine-sampling port 142 of the connector 140 of the catheter assembly 110 includes, in some embodiments, a thread with a left-handed thread pattern, a thread pattern in which a first lead has a lead diameter greater than a second lead, a thread pattern having more than two leads such as three leads, or a left-handed thread pattern having more than two leads such as three leads. The urine-sampling port 142 is configured to mate with a complementary thread of the tip 156 at the end of the barrel 152 of the sampling-port access device 150. The complementary thread ensures proper mating of the urine-sampling port 142 and the tip 156 at the end of the barrel 152 of the sampling-port access device 150 for aseptic urine sampling.

Also, in view of the foregoing, the tip 156 at the end of the barrel 152 of the sampling-port access device 150 includes, in some embodiments, a thread with a left-handed thread pattern, a thread pattern in which a first lead has a lead diameter greater than a second lead, a thread pattern having more than two leads such as three leads, or a left-handed thread pattern having more than two leads such as three leads. The tip 156 at the end of the barrel 152 of the sampling-port access device 150 is configured to mate with a complementary thread of a sampling port of another device such as, but not limited to, the urine-sampling port 142 of the connector 140 of the catheter assembly 110. The complementary thread ensures proper mating of the sampling-port access device 150 and the sampling port of the other device for aseptic sampling such as aseptic urine sampling or blood sampling.

Thread Forms

FIG. 4C provides a schematic illustrating a cross-section of the substrate 400B with the thread 410B having the first thread pattern including two leads. Section D of FIG. 4C is also shown in FIG. 5A, which provides a schematic illustrating a first thread form 500A in accordance with some embodiments.

The thread form 500A represents a thread having one or more leads, wherein each lead of the one or more leads has the same square-shaped thread form in cross section. As exemplified by the thread form 500A, a thread such as any thread of the threads 410A, 410B, 410D, and 410F can have a crest such as crest 502A, a root such as root 504A, and a flank or face such as 506A.

FIG. 5B provides a schematic illustrating a second thread form 500B in accordance with some embodiments.

The thread form 500B represents a thread having one or more leads, wherein each lead of the one or more leads has the same rounded square-shaped thread form in cross section. Compared to the thread form 500A, the thread form 500B is different in that crests and roots of the square-shaped thread form 500A are rounded to form the rounded square-shaped thread form 500B.

FIG. 5C provides a schematic illustrating a third thread form 500C in accordance with some embodiments.

The thread form 500C represents a thread having one or more leads, wherein each lead of the one or more leads has the same trapezoid-shaped thread form in cross section.

FIG. 5D provides a schematic illustrating a fourth thread form 500D in accordance with some embodiments.

The thread form 500D represents a thread having one or more leads, wherein each lead of the one or more leads has the same knuckle-shaped thread form in cross section.

FIG. 5E provides a schematic illustrating a fifth thread form 500E in accordance with some embodiments.

The thread form 500E represents a thread having one or more leads, wherein each lead of the one or more leads has the same triangle-shaped thread form in cross section. As exemplified by the thread form 500E, a thread such as any thread of the threads 410A, 410B, 410D, and 410F can have a crest such as crest 502E, a root such as root 504E, and a flank or face such as 506E. In addition, a thread angle 508E between faces of the thread is shown in FIG. 5E.

FIG. 5F provides a schematic illustrating a sixth thread form 500F in accordance with some embodiments.

The thread form 500F represents a thread having one or more leads, wherein each lead of the one or more leads has the same truncated triangle-shaped thread form in cross section. Compared to the thread form 500E, the thread form 500F is different in that crests of the triangle-shaped thread form 500E are truncated and roots are flatly threaded to form the truncated triangle-shaped thread form 500F.

FIG. 5G provides a schematic illustrating a seventh thread form 500G in accordance with some embodiments.

The thread form 500G represents a thread having one or more leads, wherein each lead of the one or more leads has the same triangle-shaped thread form in cross section. Compared to the thread form 500E, the thread form 500G is different in that triangles of the triangle-shaped thread form 500E are skewed from an isosceles-type of triangle to a scalene-type of triangle to form the triangle-shaped thread form 500G, which can also be described as sawtooth thread form.

FIG. 5H provides a schematic illustrating an eighth thread form 500H in accordance with some embodiments.

The thread form 500A represents a thread having one or more leads, wherein each lead of the one or more leads has the same rounded triangle-shaped thread form in cross section.

FIG. 4E provides a schematic illustrating a cross-section of the substrate 400D with the thread 410D having the second thread pattern including two leads. Section G of FIG. 4E is also shown in FIG. 5I, which provides a schematic illustrating a ninth thread form 500I in accordance with some embodiments.

The thread form 500I represents a thread having two or more leads, wherein a first lead of the two or more leads has a square-shaped thread form in cross section and a second lead of the two or more leads also has a square-shaped thread form in cross section but of a different relative size.

FIG. 5J provides a schematic illustrating a tenth thread form 500J in accordance with some embodiments.

The thread form 500J represents a thread having two or more leads, wherein a first lead of the two or more leads has a truncated triangle-shaped thread form in cross section and a second lead of the two or more leads also has a truncated triangle-shaped thread form in cross section but of a different relative size.

FIG. 5K provides a schematic illustrating an eleventh thread form 500K in accordance with some embodiments.

The thread form 500K represents a thread having two or more leads, wherein a first lead of the two or more leads has a truncated triangle-shaped thread form in cross section and a second lead of the two or more leads has a square-shaped thread form in cross section, and wherein the thread forms are of different relative sizes.

FIG. 5L provides a schematic illustrating a twelfth thread form 500L in accordance with some embodiments.

The thread form 500L represents a thread having three or more leads, wherein a first lead of the three or more leads has a rounded-square shaped thread form in cross section, a second lead of the three or more leads has a rounded triangle-shaped thread form in cross section, and a third lead of the three or more leads has a knuckle-shaped thread form in cross section.

Methods

Methods for aseptic urine sampling include, but are not limited to, donning sterile gloves, cleaning a urine-sampling port of a catheter assembly such as the urine-sampling port 142 of the connector 140 of the catheter assembly 110, optionally, with an antiseptic towelette, fluidly connecting a sampling-port access device such as the sampling-port access device 150 to the urine-sampling port 142, and aspirating a urine sample from the urine-sampling port 142.

In addition, a method for aseptic urine sampling can further include clamping the drainage tubing 132 of the catheter assembly 110 with a tubing clamp between the urine-sampling port 142 and a drainage bag of the catheter assembly 110. Clamping the drainage tubing 132 with the tubing clamp allows urine to back up into the urine-sampling port 142 for the urine sampling.

In addition, a method for aseptic urine sampling can further include matching the color of the tip 156 of the sampling-port access device 150 and the urine-sampling port 142 to ensure the appropriate sampling-port access device is being used with the catheter assembly 110 for the aseptic urine sampling. This reduces a risk of urine-sample contamination by any attempted misconnection of a sampling-port access device that is foreign to the urine-sampling system 100.

In addition, the method for aseptic urine sampling can further include screwing the sampling-port access device 150 onto or into the urine-sampling port 142 in a clockwise or counterclockwise direction in accordance with the complementary right-handed or left-handed threads of the tip 156 of the sampling-port access device 150 and the urine-sampling port 142 of the connector 140 of the catheter assembly 110.

In addition, the method for aseptic urine sampling can further include obtaining one or more septum-stoppered test tubes and sliding at least one test tube of the one or more test tubes into the barrel 152 of the sampling-port access device 150. Sliding the at least one test tube of the one or more test tubes into the barrel 152 of the sampling-port access device 150 pierces the septum stopper of the test tube with the hollow needle 154 disposed in the barrel 152 of the sampling-port access device 150. Once the needle 154 pierces the septum stopper of the test tube, urine is automatically aspirated into the test tube from the urine-sampling port 142 due to the less-than-atmospheric internal pressure of the test tube to provide a urine sample.

Following the aseptic urine sampling, the urine sample or urine samples in the one or more test tubes can be labeled, optionally refrigerated, and subsequently put in a transport pouch for transport to a lab for urinalysis or microbiological analysis.

An advantage of the urine-sampling systems and the aseptic urine-sampling methods includes a standardization of clinical practice for taking urine samples from catheterized patients, thereby eliminating the risk of patient infection, contaminated samples (by sample-port contamination), and false-positive urine cultures. Furthermore, the method of aseptic urine sampling ensures compliance with CDC guidelines related thereto.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. A urine-sampling system for aseptic urine sampling comprising:
   a catheter assembly including a urinary catheter, drainage tubing, and a connector fluidly connecting the urinary catheter to the drainage tubing, the connector including a urine-sampling port having a thread with a thread pattern in which;
      a first lead has a lead diameter greater than a second lead, and
      a lead pitch of the first lead or the second lead is a multiple of a pitch between adjacent crests or roots of the first lead and the second lead; and
   a sampling-port access device including a barrel tip at an end of a barrel configured to fluidly connect the sampling-port access device to the urine-sampling port of the catheter assembly, the barrel tip also having the thread with the thread pattern in which the first lead has the lead diameter greater than the second lead,
   wherein each of the barrel tip of the sampling-port access device and the urine-sampling port exclusively mates with the other of the barrel tip of the sampling-port access device and the urine-sampling port exclusive of a standard medical-industry fastening system, thereby ensuring proper mating of the barrel tip of the sampling-port access device and the urine-sampling port for aseptic urine sampling.

2. The urine-sampling system of claim 1, wherein the barrel tip of the sampling-port access device includes an internal thread of a lock ring or a rotatable lock collar around a male connector of the barrel tip of the sampling-port access device configured to exclusively mate with an external thread about a female connector of the urine-sampling port.

3. The urine-sampling system of claim 1, wherein the barrel tip of the sampling-port access device includes an external thread about a male connector of the barrel tip of the sampling-port access device configured to exclusively mate with an internal thread of a female connector of the urine-sampling port.

4. The urine-sampling system of claim 2, wherein the thread pattern has more than two leads, the first lead of the more than two leads has the lead diameter greater than the second lead of the more than two leads.

5. The urine-sampling system of claim 2, wherein the thread pattern has three leads.

6. The urine-sampling system of claim 2, wherein the thread pattern includes a left-handed thread pattern.

7. The urine-sampling system of claim 1, wherein each of the barrel tip of the sampling-port access device and the urine-sampling port matches a color of the other of the barrel tip of the sampling-port access device and the urine-sampling port, thereby reducing a risk of urine-sample contamination by attempted misconnection of the barrel tip of the sampling-port access device or the urine-sampling port.

8. The urine-sampling system of claim 1, further comprising:
one or more septum-stoppered test tubes, each test tube of the one or more septum-stoppered test tubes having an internal pressure less than atmospheric pressure,
wherein each test tube of the one or more septum-stoppered test tubes is independently configured to include therein a formulation for urinalysis, a formulation for microbiological analysis, or no additives or preservatives.

9. The urine-sampling system of claim 8, wherein each test tube of the one or more septum-stoppered test tubes has an outer diameter commensurate with or smaller than an inner diameter of the barrel of the sampling-port access device, thereby allowing each test tube to slide into the barrel to pierce a septum stopper of each test tube with a needle of the sampling-port access device for urine sampling.

10. A catheter assembly comprising:
a urinary catheter;
drainage tubing; and
a connector fluidly connecting the urinary catheter to the drainage tubing, the connector including a urine-sampling port having a thread with a thread pattern in which:
a first lead has a lead diameter greater than a second lead, and
a lead pitch of the first lead or the second lead is a multiple of a pitch between adjacent crests or roots of the first lead and the second lead, the connector configured to exclusively mate with a complementary thread of a tip of a sampling-port access device exclusive of a standard medical-industry fastening system, thereby ensuring proper mating of the urine-sampling port and the sampling-port access device for aseptic urine sampling.

11. The catheter assembly of claim 10, wherein the thread includes an external thread about a female connector of the urine-sampling port.

12. The catheter assembly of claim 10, wherein the thread includes an internal thread of a female connector of the urine-sampling port.

13. The catheter assembly of claim 10, wherein the thread includes the thread pattern having three leads.

14. The catheter assembly of claim 10, wherein the thread includes a left-handed thread pattern.

15. A sampling-port access device comprising:
a barrel;
a hollow needle including a needle tip, the hollow needle coaxially disposed within the barrel such that the needle tip is protected by the barrel; and
a barrel tip at an end of the barrel fluidly connected to the hollow needle, the barrel tip having a thread with a thread pattern in which:
a first lead has a lead diameter greater than a second lead, and
a lead pitch of the first lead or the second lead is a multiple of a pitch between adjacent crests or roots of the first lead and the second lead, the barrel tip configured to exclusively mate with a complementary thread of a sampling port of another device exclusive of a standard medical-industry fastening system, thereby ensuring proper mating of the sampling-port access device and the sampling port of the other device for aseptic sampling.

16. The sampling-port access device of claim 15, wherein the thread includes an internal thread of a lock ring or a lock collar around a male connector of the barrel tip of the sampling-port access device.

17. The sampling-port access device of claim 16, wherein the lock ring is either non-rotatably attached to the barrel or molded with the barrel, the sampling-port access device configured to mate with the sampling port of another device by screwing a whole of the sampling-port access device onto the sampling port of the other device.

18. The sampling-port access device of claim 16, wherein the lock collar is rotatably attached to the barrel, the sampling-port access device configured to mate with a sampling port of another device by screwing the lock collar of the sampling-port access device onto the sampling port of the other device while holding the barrel stationary.

19. The sampling-port access device of claim 15, wherein the thread includes an external thread about a male connector of the barrel tip of the sampling-port access device.

20. The sampling-port access device of claim 15, wherein the thread includes a left-handed thread pattern having three leads.

21. The sampling-port access device of claim 15, wherein the thread of the barrel tip being configured to exclusively mate with the complementary thread of the sampling port provides an enhanced mechanical integrity over that of the standard medical-industry fastening system by way of at least reduced precessional motion when mating the barrel tip with the sampling port.

22. The sampling-port access device of claim 21, wherein the enhanced mechanical integrity reduces fumbling and, thus, contamination-inducing acts when mating the barrel tip with the sampling port.

23. The sampling-port access device of claim 15, wherein the thread of the barrel tip being configured to exclusively mate with the complementary thread of the sampling port provides an enhanced fluid-seal integrity over that of the standard medical-industry fastening system, which reduces contamination-inducing acts when mating the barrel tip with the sampling port.

* * * * *